United States Patent [19]

Fischer et al.

[11] Patent Number: 4,893,974

[45] Date of Patent: Jan. 16, 1990

[54] COMPOSITE PLUG FOR MOUNTING OBJECTS IN A DRILLED HOLE IN MASONRY

[75] Inventors: Artur Fischer; Jörg Fischer, both of Waldachtal/Tumlingen, Fed. Rep. of Germany

[73] Assignee: Fischerwerke Artur Fischer GmbH & Co. KG, Waldachtal/Tumlingen, Fed. Rep. of Germany

[21] Appl. No.: 295,118

[22] Filed: Jan. 9, 1989

[30] Foreign Application Priority Data

Jan. 14, 1988 [DE] Fed. Rep. of Germany ....... 3800833

[51] Int. Cl.⁴ .................... F16B 39/00; F16B 39/02
[52] U.S. Cl. .................................. 411/82; 411/258; 405/260; 52/704
[58] Field of Search .................. 411/59, 60, 82, 258, 411/23; 52/698, 704; 405/260

[56] References Cited

U.S. PATENT DOCUMENTS

| | | | |
|---|---|---|---|
| 3,308,585 | 3/1967 | Fischer | 52/704 |
| 4,050,202 | 9/1977 | Fischer et al. | 52/704 |
| 4,063,582 | 12/1977 | Fischer | 52/704 |
| 4,712,957 | 12/1987 | Edwards et al. | 411/258 |

FOREIGN PATENT DOCUMENTS 2550954 3/1978 Fed. Rep. of Germany ........ 411/82

Primary Examiner—Neill R. Wilson
Attorney, Agent, or Firm—Michael J. Striker

[57] ABSTRACT

The composite plug for mounting objects in holes drilled in masonry and the like comprises a plug body having a screw passage for receiving a mounting screw and an expanding region expandable by insertion of the mounting screw, the plug body being provided with outlet openings for mortar introduced into the plug body, channels forming guiding surfaces in the screw passage, the guiding surfaces leading to the outlet openings and subdividing the screw passage into a front region and a rear region, and grooves forming longitudinal channels extending along an outside of the plug body, the outlet openings merging into the longitudinal channels. The outlet openings are located in the front region and the screw passage has a portion with an increased diameter. A stopper which is insertable in the portion of the screw passage of increased diameter is provided and formed as a hollow member. The stopper has openings which are in a alignment with the outlet openings.

13 Claims, 1 Drawing Sheet

U.S. Patent   Jan. 16, 1990   4,893,974
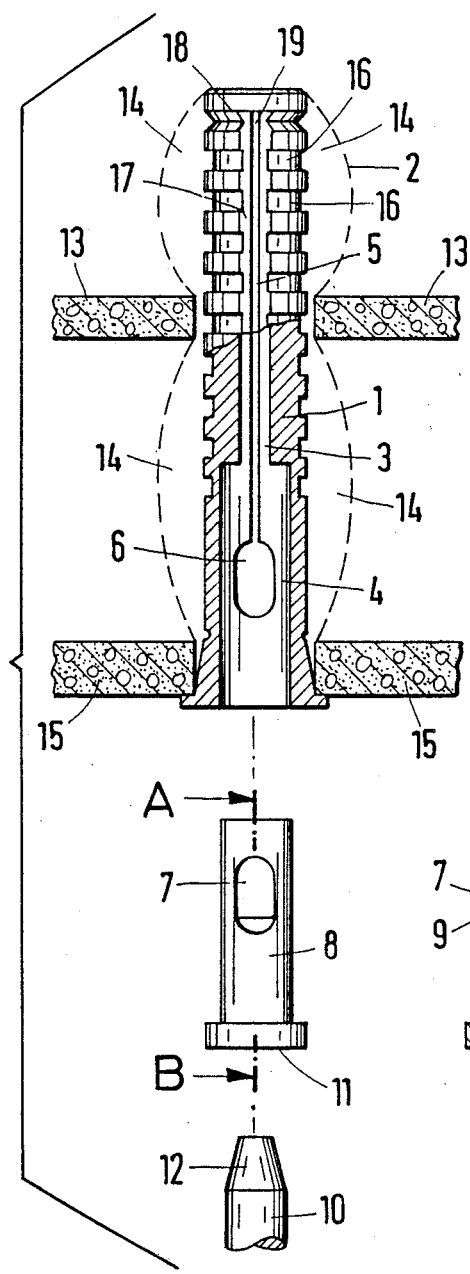
Fig. 1
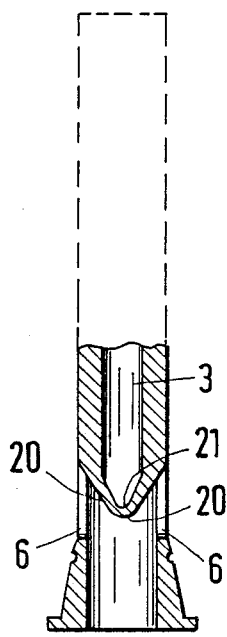
Fig. 3
Fig. 2

COMPOSITE PLUG FOR MOUNTING OBJECTS IN A DRILLED HOLE IN MASONRY

BACKGROUND OF THE INVENTION

The present invention relates to a plug, more particularly to a composite plug for mounting objects in drilled holes of masonry and the like.

Plugs of the above mentioned general type are known in the art. Plugs for mounting elements used in drill holes of a masonry firmly anchored in masonry by injecting a mortar or a corresponding bonding agent. Such an anchoring is disclosed for example in the German document DE-OS 2,830,073. In order to anchor a mounting element, it is necessary first of all to introduce into the bore hole an expansible sleeve which can be composed of a narrow-meshed fabric. Then a foamable synthetic plastic material is introduced and causes the fabric to expand. Finally, the actual mounting element is inserted. The mounting of a mounting element by means of mortar or the like is often especially necessary in porous or brittle masonry to obtain high holding forces. The known plugs of the above mentioned type have been time consuming to use and also not allowed through-mounting for mounting of laths or frames.

SUMMARY OF THE INVENTION

Accordingly, it is an object of the present invention to provide a plug which avoids the disadvantages of the prior art.

More particularly, it is an object of the present invention to provide a plug which is simple to use and insures a pre-mounting before hardening of the bonding agent.

In keeping with these objects and with others which will become apparent hereinafter, one feature of the present invention resides, briefly stated, in a plug in which a plug body is provided with guide surfaces located in a screw passage of the plug body and leading to outlet openings of the plug body, the screw passage is subdivided into a front region and a rear region by the guide surfaces, the outlet openings merge into longitudinal channels extending on the outside of the plug body.

In the front region when the mounting screw will later be screwed in, the plug has outlet openings on its body or its shaft, the outlet openings lead laterally from the screw passage to the outside of the plug. This front region is closed relative to the remaining portion of the screw passage by the guiding surfaces, so that a mortar which is injected into the plug does not penetrate into the portion of the screw passage located behind the guiding surfaces. Mortar is guided along the guiding surfaces through the outlet openings outwardly and then can pass in the longitudinal channels along the plug to the plug end. After the injection of the mortar, the guiding surfaces are removed or pierced by the inserted mounting screw. The mounting screw then penetrates into the rear portion of the screw passage, in which there are no troublesome elements of mortar. Even if the rear region of the plug were provided with narrow slots, the insignificant amount of mortar in the region of the longitudinal slots could be displaced easily when the mounting screw was being screwed in.

In accordance with another feature of the present invention, the screw passage in a front region is provided with a portion of an increased diameter as compared with the rear region. A removable stopper can be inserted into the region of the increased diameter. The stopper can be formed as a hollow member provided with the outlet openings and the guiding surfaces.

In accordance with another feature of the present invention, for preventing incorrect insertion of the stopper, centering elements can be provided on the stopper and on the plug shaft in cooperation with one another.

Still another feature of the present invention is that instead of a stop, the guiding surfaces can be formed on an injection-molded membrane located between the front region and the rear region of the screw passage. The membrane is pierced through during insertion of the mounting screw. In this case the plug together with the membrane is formed as a one-piece integral part of synthetic plastic material.

The longitudinal channels which serve as passages for the mortar and extend from the outlet openings in the longitudinal direction of the plug can have preferably a V-shaped cross-section. The base of the grooves can be formed thin-walled, so that during rotation of the mounting screw the base of the grooves tears off and makes possible unhindered expansion of the plug. The longitudinal channels on the other hand can also be formed so that in the region of the base of the channels a small gap completely separates the plug shaft. When this gap is made correspondingly small, no mortar passes into the screw passage extending below it.

In accordance with a preferred embodiment of the invention, the plug body or shaft is surrounded by a fabric which is expansible and narrow-meshed. During injection of the mortar, the fabric bulges outwardly. However, because of the narrow-mesh it holds the mortar between the fabric and the plug shaft. When the plug is inserted into a honeycomb block or into a drilled hole with lateral bulges, the fabric together with the injected mortar forms corresponding bulges which produce a positive form-locking connection between the plug and the masonry after hardening of the mortar.

The plug in accordance with the present invention can also be formed without a sock-shaped fabric, especially for use in solid building materials. It is especially advantageous when the outer surface of the plug has a rough structure, in addition to the outer grooves. Such a surface insures a good connection between the mortar and the plug.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a plug in accordance with the present invention, which is provided with a stopper and inserted into a honeycomb block;

FIG. 2 is a view showing the stopper to be used with the plug of FIG. 1, in a longitudinal section; and FIG. 3 is a view showing a plug in accordance with another embodiment of the present invention, in which the plug is provided with an injection molded membrane instead of the stopper.

DESCRIPTION OF THE PREFERRED EMBODIMENTS

A plug in accordance with the present invention includes a plug shaft which is identified with reference numeral 1 and a piece of fabric which is identified with reference numeral 2 and surrounds the plug shaft 1. The fabric 2 is shown in broken lines.

The plug shaft 1 is provided with a screw passage 3. The screw passage 3 has a front region 4 with an increased diameter and a rear region 5. Two oppositely located outlet openings 6 are provided in the front region 4. They are in alignment with openings 7 provided in a stopper 8 when the latter is inserted into the front region 4. The stopper 8 is formed as a hollow body as can be seen from FIG. 2 showing a longitudinal section along the cutting line A-B.

The stopper 8 is formed with wedge-shaped guide surfaces 9 which lead to the openings 7. When the stopper 8 is inserted in the plug shaft 1 and an injecting device 10 placed on a mouth 11 of the stopper 8, the binding mortar can be introduced through an injection nozzle 12 into the hollow space of the stopper 8 and from there flows through the openings 7 and the corresponding outlet openings 6. During this process the fabric 2 is bulged out locally over some portions as shown in the drawings. After the end of the injection process, the stopper 8 is removed and a mounting screw can be screwed into the screw passage 3. As a result, the rear region of the plug expands, whereby the plug is braced against the wall portions 13. In this manner a preliminary mounting is possible.

As soon as the mortar located within the broken line which identifies the fabric has hardened, a positive form-locking connection is produced between the wall portions 3 and 15 and the plug shaft 1.

An especially good connection between the mortar 14 and the plug shaft 1 is obtained when the plug has a structured and/or roughened plug surface. By "a structured and/or roughened plug surface" we mean a surface which is not smooth. A "structured" surface particularly could contain notches, surface channels and circular grooves. In the shown embodiment the plug is additionally provided with a plurality of annular grooves 16.

Longitudinal channels 17 extend from the outlet openings 6 to an end 18 of the plug shaft 1. The injected mortar can be distributed in the longitudinal channels 17 inside the drilled hole or the entire length of the plug shaft 1. Longitudinal channels 17 have a V-shaped cross-section and provide for uniform distribution of the mortar, especially in narrow drilled holes or in drilled holes with narrowed portions.

The longitudinal channels 17 have a small longitudinal gap 19 which allows unhindered expansion of the plug shaft 1. The gap 19 can however be closed by a thin injection molded membrane which tears off during expansion.

In another embodiment which is shown in FIG. 3, instead of the stopper 8, integrated guide surfaces 20 are provided. They are formed by a thin injection molded membrane 21 located between the front region 4 and the rear region 5. The injection molded membrane 21 seals off completely the abovementioned regions 4 and 5, thereby the mortar injected into the plug from the front is guided outwardly through the outlet openings 6. As for other features the plug shown in FIG. 3 can be formed similarly to the plug of FIG. 1. When a mounting screw is inserted from the front into the plug the tip of the mounting screw penetrates the injection molded membrane 21. The injection membrane 21 is pierced and the mounting screw can thereby enter the narrower portion of the screw passage 3.

It will be understood that each of the elements described above, or two or more together, may also find a useful application in other types of constructions differing from the types described above.

While the invention has been illustrated and described as embodied in a plug, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for invention. various applications without omitting features that, from the standpoint of prior art, fairly constitute essential characteristics of the generic of specific aspects of this invention.

What is claimed as new and desired to be protected by Letters Patent is set forth in the appended claims.

1. A plug, comprising a plug body having a screw passage for receiving a mounting screw and an expanding region expandable by insertion of said mounting screw, said screw passage having a portion with an increased diameter, said plug body being provided with outlet openings for mortar introduced into said plug body; means forming guide surfaces in said screw passage, said guide surfaces leading to said outlet openings and subdividing said screw passage into a front region and a rear region, said outlet openings being located in said front region; means forming longitudinal channels extending along an outside of said plug body, said outlet openings merging into said longitudinal channels; and a stopper which is inserted in said portion of said increased diameter and formed as a hollow member, said stopper having openings which are in alignment with said outer openings.

2. A plug as defined in claim 1, wherein said stopper has wedge-shaped surfaces which form said guide surfaces, said guide surfaces leading to said openings of said stopper.

3. A plug as defined in claim 1, wherein said stopper and said plug body are provided with corresponding centering elements cooperating with one another.

4. A plug as defined in claim 1; and further comprising an expansible, narrow-meshed fabric which surrounds said plug body and is fixedly connected with the latter.

5. A plug as defined in claim 4, wherein said fabric has two ends and is connected with said plug body at both said ends.

6. A plug as defined in claim 1, wherein said plug body has a non-smooth outer surface.

7. A plug as defined in claim 6, wherein said outer surface of said plug body is structured.

8. A plug as defined in claim 6, wherein said outer surface of said plug body is roughened.

9. A plug, comprising a plug body having a screw passage for receiving a mounting screw with a portion and an expanding region expandable by insertion of said mounting screw, said plug body being provided with outlet openings for mortar introduced into said plug body; means forming guide surfaces in said screw passage, said guide surfaces leading to said outlet openings and subdividing said screw passage into a front region and a rear region, means forming longitudinal channels extending along an outside of said plug body, said outlet openings merging into said longitudinal channels, and a thin membrane forming said guide surfaces.

10. A plug as defined in claim 9, wherein said thin membrane is connected with said plug body.

11. A plug as defined in claim 9, wherein said thin membrane is formed of one piece integrally with said plug body.

12. A plug, comprising a plug body having a screw passage for receiving a mounting screw and an expanding region expandable by insertion of said mounting screw, said plug body being provided with outlet openings for mortar introduced into said plug body; means forming guide surfaces in said screw passage, said guide surfaces leading to said outlet openings and subdividing said screw passage into a front region and a rear region, and means forming longitudinal channels with a V-shaped cross section extending along an outside of said plug body, said outlet openings merging into said longitudinal channels.

13. A plug as defined in claim 12, wherein said plug body has a wall, said longitudinal channels extending completely through said wall and being provided at a bottom with a small gap.

* * * * *